No. 766,298. PATENTED AUG. 2, 1904.
G. VOELLNER & P. DEVAUX.
SHEARS.
APPLICATION FILED JUNE 2, 1903.
NO MODEL.
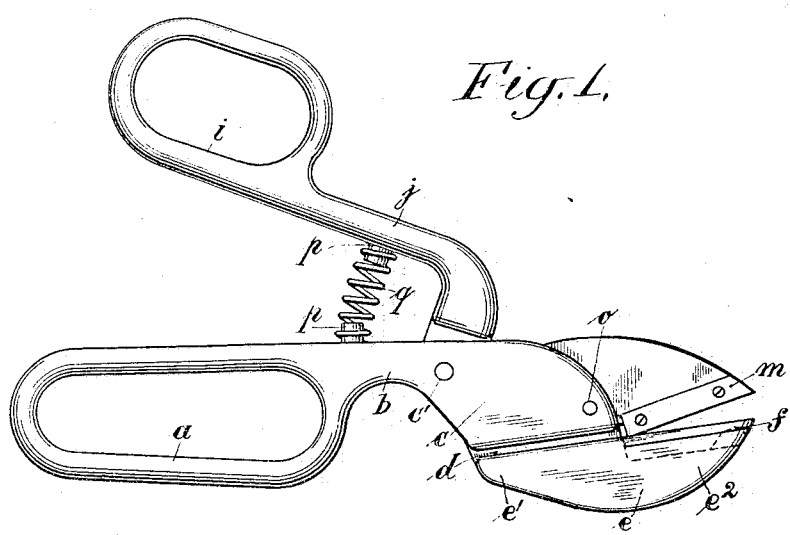
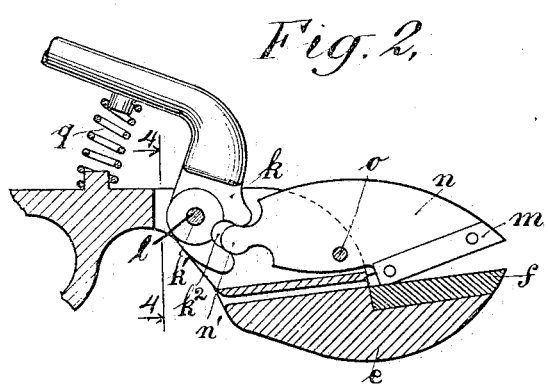
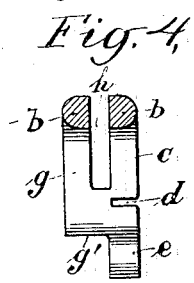
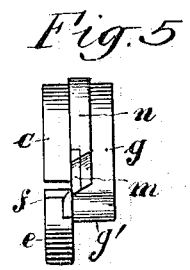
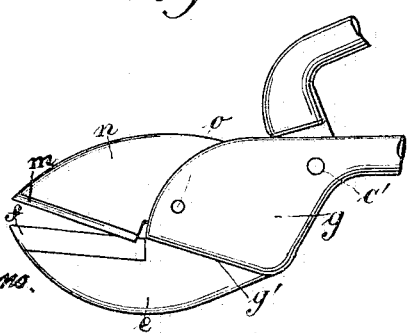
WITNESSES:
Hattie B. Louden
Lily D. Williams
INVENTORS
George Voellner,
Paul Devaux,
BY
L. H. Böhm,
their ATTORNEY.

UNITED STATES PATENT OFFICE.

GEORGE VOELLNER AND PAUL DEVAUX, OF NEW YORK, N. Y., ASSIGNORS OF ONE-HALF TO MORIZ EGGEMAN, OF NEW YORK, N. Y.

SHEARS.

SPECIFICATION forming part of Letters Patent No. 766,298, dated August 2, 1904.

Application filed June 2, 1903. Serial No. 159,772. (No model.)

*To all whom it may concern:*

Be it known that we, GEORGE VOELLNER, a subject of the German Emperor, and PAUL DEVAUX, a citizen of the Republic of Switzerland, both residents of New York, in the county and State of New York, have invented certain new and useful Improvements in Shears, of which the following is a specification.

This invention has reference to shears, and pertains particularly to a novel construction of shears used for cutting sheet metal, such as sheet-steel, sheet-iron, and copper sheeting, &c. The shears further are adapted to cut tubes open lengthwise.

It is the special object of this invention to provide sheet-metal-cutting shears so constructed that the cutting may go on interruptedly by means of a metal-sheet-guiding channel on one side and a metal-sheet-guiding surface on the other.

The invention further consists in the combination of parts, and both handles always remain above the sheeting to be cut.

Heretofore the shears usually employed for cutting sheet metal were practically of the same shape as the common shears used in every household. They were merely made stronger and usually possessed longer handles. In cutting with those shears it was necessary to turn the cut portions one up and one down for the purpose of enabling the operator to continue the cutting farther than the length of the shears proper and one handle remained below the metal sheet. The strong heavy shears formerly employed made it necessary to turn the cut portions somewhat sidewise, whereby they lost their shape.

The above-described deficiencies are fully avoided in our novel shears. The metal-sheet-guiding channel on one side and the metal-sheet-guiding surface on the other enable the operator to continue the cutting without bending the cut portions. The cutting-blades may be separately made, so that the same can be replaced. The shears further are provided with a device which represents a compound lever for the purpose of increasing the pressure on the cutting-blades, the bolt being in such a location that the handle represents a relatively long lever-arm, and therefore the handles may be accordingly shorter. The novel construction of our shears enables the operator to have both handles above the sheeting to be cut or above the tube to be cut open lengthwise during the whole operation of cutting, which is an essential advantage.

The invention is illustrated in the accompanying drawings, in which—

Figure 1 illustrates the shears in side elevation which embody our invention. Fig. 2 is a central longitudinal section through same. Fig. 3 is a detail reverse elevation of Fig. 1. Fig. 4 is a cross-section on line 4 4 of Fig. 2, and Fig. 5 is a front view showing particularly the blades.

Similar characters of reference denote like parts in all the figures.

The shears are preferably made of machine-steel, while the two cutting-blades are made of very hard steel, which may be of different qualities, according to requirements. A pair of shears to be used exclusively for cutting steel sheeting or to be used in small machine-shops for cutting any kind of sheeting, including steel sheeting, requires blades of very hard steel, while a pair of shears used exclusively for cutting copper or aluminium sheeting may have blades of a kind of steel which is not quite so hard.

The lower half of the shears (illustrated in Figs. 1, 2, and 3) comprise a handle $a$, a short arm $b$, extending then into a broad portion $c$, which is provided with a horizontal channel $d$. Below the channel the broad portion extends downwardly and forwardly, forming a cheek $e$. The rear portion $e'$ of the cheek $e$ extends somewhat below the channel and broadens out, forming a curved portion $e^2$. The cutting edge of the blade $f$ is in one plane with the lower surface of the channel $d$. The depth of the channel is so selected that its inner surface practically forms one line with the cutting edge of the blade $f$, and the portion $e$ is of about the same width as the channel $d$, as is plainly seen in Fig. 4.

Opposite the portion $c$ there is formed a heavy cheek $g$. (Shown in Figs. 3, 4, and 5.) This cheek forms a relatively wide bottom guiding-surface $g'$, which extends from near the inner end of the cutting edge of the blade $f$ backwardly and a little downwardly. The portion $c$ and the cheek $g$ are separated by a channel $h$, which extends in the front to near the cutting-blade $f$ (see Fig. 5) and in the rear of same above the side channel $d$, as is shown in Fig. 4.

The upper half of the shears comprises a handle $i$ and an arm $j$, which at its lower end is reduced in width to such an extent that the reduced portion fits into the channel $h$. This reduced portion is plainly seen in Fig. 2 and forms a jaw which has an opening $k'$ in its rear portion. Near this opening there is an almost circular recess $k^2$. Two similar openings $c'$ $c'$ are provided in the lower half of the shears, (see Figs. 1 and 3,) and the upper parts so far described are joined here by means of a bolt $l$.

The upper cutting-blade $m$ is contained on an independent part $n$ of such width that it fits into the channel $h$. The blade-carrying part $n$ is curved at the top and bottom, as is seen in Fig. 2, and where the cutting-blade is secured it extends a little farther down. In the rear the portion $n$ has an extension $n'$, which is almost circular in shape and fits into the recess $k^2$. This top blade-carrying portion is permanently secured in the slot $h$ by means of a bolt $o$. (See Figs. 1, 2, and 3.) It is mounted so that the circular extension is located in the recess $k^2$, as is seen in Fig. 4. The part $n$ may be directly made of hard steel and the cutting edge $m$ formed thereon, so that same is integral therewith.

The inner surface of each arm $b$ and $j$ is provided with a knob $p$. (See Figs. 1 and 2.) A spring $q$, which need not be permanently fixed to the knobs, is inserted between the handles and these knobs for the purpose of keeping the shears open when not in use.

The upper half of the shears, as described, consists of two portions, the portion $n$ being secured by means of a bolt $o$, so that it is divided into almost two halves. The handle, arm, and jaw, however, are secured by means of the bolt $l$, which passes through the jaw near its end. Thus this portion of the upper half forms a compound lever, the short arm of which extends from the bolt $l$ to the right-hand end of the jaw, while the long arm extends from the bolt $l$ up to the end of the handle. It is plainly seen that in consequence of this arrangement the handles need not be as long as usual for exerting the same amount of force on the sheeting to be cut. Shorter shears are thereby obtained, which involves a saving of material and gives a more convenient tool to handle, which occupies less space.

The operation of the shears is very plain. The sheeting to be cut is brought between the cutting-blades and the cutting done in the usual manner. Upon reaching the end of the cutting-blades the one cut portion will pass through the guiding-channel $d$, while the other cut portion will pass along the guiding-surface $g'$. It is plainly seen that the handles of the shears, owing to their peculiar construction, will always remain above the sheeting which is cut, enabling thus the operator to continue without any obstruction. The cut portion simply passes on beyond the guiding-channel $d$ and the guiding-surface $g'$ without being in the way of the operator. The fact that the handles of the shears during their use always remain above the object to be cut makes it possible to cut tubes open lengthwise, as is plainly seen from the above.

Having thus described our invention, we claim as new and desire to secure by Letters Patent—

1. Shears for cutting metal sheeting and slitting tubes adapted to be operated without distorting the cut or slit portions, comprising a lower half with cutting-blade and handle, means thereon for guiding the cut or slit portions and a central vertical channel in its top portion, in combination with an upper half composed of a double lever having a cutting-blade and handle, and secured in said vertical channel so that the handles are located in one plane.

2. In shears for cutting metal sheeting and slitting metal tubes a lower half with cutting-blade and handle, a guiding-channel therein on one side located in one horizontal plane with the cutting edge, a cheek on the other side with a lower guiding-surface thereon, and a central vertical channel in the upper portion of said lower half at a right angle to the guiding-channel, all in combination with an upper half of the shears.

In testimony whereof we have hereunto set our hands, in the presence of two subscribing witnesses, this 29th day of May, 1903.

GEORGE VOELLNER.
PAUL DEVAUX.

Witnesses:
HATTIE B. LUEDERS,
LILY D. WILLIAMS.